(12) United States Patent
Akino et al.

(10) Patent No.: US 8,705,165 B2
(45) Date of Patent: Apr. 22, 2014

(54) OPTICAL WAVELENGTH CONVERSION ELEMENT, WAVELENGTH CONVERSION LASER DEVICE, AND IMAGE DISPLAY DEVICE

(75) Inventors: Yosuke Akino, Tokyo (JP); Yoshihito Hirano, Tokyo (JP); Takayuki Yanagisawa, Tokyo (JP); Shuhei Yamamoto, Tokyo (JP); Tsutomu Nagatsuka, Tokyo (JP); Toshiyuki Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 419 days.

(21) Appl. No.: 13/121,135

(22) PCT Filed: Sep. 17, 2009

(86) PCT No.: PCT/JP2009/066287
§ 371 (c)(1),
(2), (4) Date: Mar. 25, 2011

(87) PCT Pub. No.: WO2010/035694
PCT Pub. Date: Apr. 1, 2010

(65) Prior Publication Data
US 2011/0194171 A1 Aug. 11, 2011

(30) Foreign Application Priority Data
Sep. 26, 2008 (JP) .................. 2008-248245

(51) Int. Cl.
*G02F 1/35* (2006.01)
*G02F 1/37* (2006.01)
*G02F 1/377* (2006.01)
*H01S 3/109* (2006.01)

(52) U.S. Cl.
CPC *G02F 1/37* (2013.01); *G02F 1/377* (2013.01); *G02F 1/3775* (2013.01); *H01S 3/109* (2013.01)
USPC .............................. 359/326; 359/328; 372/22

(58) Field of Classification Search
None
See application file for complete search history.

(56) References Cited

U.S. PATENT DOCUMENTS

| 5,546,220 A | * | 8/1996 | Endo et al. ................ 359/332 |
| 5,898,718 A | * | 4/1999 | Mohatt et al. ............... 372/22 |

(Continued)

FOREIGN PATENT DOCUMENTS

| JP | 60-14222 | 1/1985 |
| JP | 5-289133 A | 11/1993 |

(Continued)

OTHER PUBLICATIONS

Extended European Search Report issued Feb. 2, 2012, in European Patent Application No. 09816109.4.

(Continued)

*Primary Examiner* — Hemang Sanghavi
(74) *Attorney, Agent, or Firm* — Oblon, Spivak, McClelland, Maier & Neustadt, L.L.P.

(57) ABSTRACT

An optical wavelength conversion element includes: a wavelength conversion waveguide that has a periodic polarization reversal structure having alternately and cyclically formed domains of which polarization directions are inverted, that guides light as a fundamental wave corresponding to the periodic polarization reversal structure, and performs a wavelength conversion of the guided fundamental wave; a first clad that is made of a dielectric having a refractive index lower than that of the wavelength conversion waveguide and is provided in contact with the domains; a second clad that is made of a dielectric having a refractive index lower than that of the wavelength conversion waveguide and is provided in contact with the domains such that the second clad is opposed to the first clad film; a first conducting unit that electrically connects the domains in parallel via the first clad; and a second conducting unit that electrically connects the domains in parallel via the second clad.

13 Claims, 8 Drawing Sheets

(56) References Cited

U.S. PATENT DOCUMENTS

| | | | |
|---|---|---|---|
| 5,943,464 A * | 8/1999 | Khodja | 385/122 |
| 2002/0041426 A1 | 4/2002 | Abe et al. | |
| 2006/0165138 A1* | 7/2006 | Kachanov et al. | 372/21 |
| 2007/0154161 A1 | 7/2007 | Bintz et al. | |
| 2009/0257463 A1* | 10/2009 | Kusukame et al. | 372/22 |
| 2010/0103088 A1 | 4/2010 | Yokoyama et al. | |
| 2011/0280512 A1* | 11/2011 | Abe et al. | 385/14 |

FOREIGN PATENT DOCUMENTS

| | | |
|---|---|---|
| JP | 9 304800 | 11/1997 |
| JP | 2002 6353 | 1/2002 |
| JP | 2002-116413 A | 4/2002 |
| JP | 2006-506689 A | 2/2006 |
| JP | 2007-322695 A | 12/2007 |
| JP | 2008 224972 | 9/2008 |
| WO | 2008 093545 | 8/2008 |

OTHER PUBLICATIONS

Ed L. Wooten, et al., "A Review of Lithium Niobate Modulators for Fiber-Optic Communications Systems", IEEE Journal of Selected Topics in Quantum Electronics, vol. 6, No. 1, XP-011061755, Jan. 1, 2000, pp. 69-82.

Sakai, K. et al., "Planar-Waveguide Quasi-Phase-Matched Second-Harmonic-Generation Device in Y-Cut MGO-Doped $LINBO_3$", Optics Letters, vol. 31, No. 21, pp. 3134-3136 (Nov. 1, 2006).

International Search Report Issued Jan. 12, 2010 in PCT/JP09/066287 filed Sep. 17, 2009.

Office Action issued May 21, 2013, in Japanese patent Application No. 2010-530826 with partial English translation.

Ed L. Wooten, et al., "A Review of Lithium Niobate Modulators for Fiber-Optic Communications Systems", IEEE Journal of Selected Topics in Quantum Electronics, vol. 6, No. 1, Jan./Feb. 2000, pp. 69-82.

* cited by examiner

OPTICAL WAVELENGTH CONVERSION ELEMENT, WAVELENGTH CONVERSION LASER DEVICE, AND IMAGE DISPLAY DEVICE

FIELD

The present invention relates to an optical wavelength conversion element that performs a wavelength conversion of light as a fundamental wave, a wavelength conversion laser device, and an image display device.

BACKGROUND

Conventionally, as an optical wavelength conversion element that performs a wavelength conversion from a fundamental wave to a harmonic, there has been known an element configured by an MgO-added $LiNbO_3$ core having a periodic polarization reversal structure, $SiO_2$ thin-film clads that sandwich the core, and a $LiNbO_3$ substrate (see, for example, Non Patent Literature 1).

CITATION LIST

Non Patent Literature

Non Patent Literature 1: K. Sakai, "Planar-waveguide quasi-phase-matched second-harmonic-generation device in Y-cut MgO-doped LiNbO3", OPTICS LETTERS, Vol. 31, No. 21, Nov. 1, 2006, pp. 3134-3136.

SUMMARY

Technical Problem

The conventional optical wavelength conversion element disclosed in Non Patent Literature 1 uses an MgO-added $LiNbO_3$ as a ferroelectric that can be polarized by an external electric field to form a periodic polarization reversal structure. A ferroelectric has pyroelectric properties. Due to pyroelectric effects attributable to a temperature change, the size of polarization within domains of a periodic polarization reversal structure changes, and a strong electric field is generated due to a polarized charge appearing at an interface with a clad. The refractive index varies in each of the domains due to a movement over time of impurity ions within the domains. A reflectance at the interface with the clad changes in each of the domains, and a waveguide loss varies. Therefore, the conventional optical wavelength conversion element has a problem such that wavelength conversion characteristics may vary over time.

The present invention has been made in view of the above, and an object of the present invention is to obtain an optical wavelength conversion element, a wavelength conversion laser device and an image display device, which reduce influences of pyroelectric effects in a wavelength conversion waveguide having a periodic polarization reversal structure and can obtain stable wavelength conversion characteristics with a small variation over time in the optical wavelength conversion element.

Solution to Problem

To achieve the object, an optical wavelength conversion element according to the present invention includes: a wavelength conversion waveguide that has a periodic polarization reversal structure having alternately and cyclically formed domains of which polarization directions are inverted, guides light as a fundamental wave corresponding to the periodic polarization reversal structure, and performs a wavelength conversion of the guided fundamental wave; a first clad that is made of a dielectric having a refractive index lower than that of the wavelength conversion waveguide and is provided in contact with each of the domains; a second clad that is made of a dielectric having a refractive index lower than that of the wavelength conversion waveguide and is provided in contact with each of the domains such that the second clad is opposed to the first clad; a first conducting unit that electrically connects each of the domains in parallel via the first clad; and a second conducting unit that electrically connects each of the domains in parallel via the second clad.

Advantageous Effects of Invention

According to the present invention, the optical wavelength conversion element electrically connects each of the domains in parallel via the clads. Therefore, influences of pyroelectric effects in a wavelength conversion waveguide having a periodic polarization reversal structure can be reduced, and stable wavelength conversion characteristics can be obtained.

DESCRIPTION OF EMBODIMENTS

Exemplary embodiments of an optical wavelength conversion element, a wavelength conversion laser device, and an image display device according to the present invention will be explained below in detail with reference to the accompanying drawings. The present invention is not limited to the following embodiments.

First Embodiment

Figure 1:
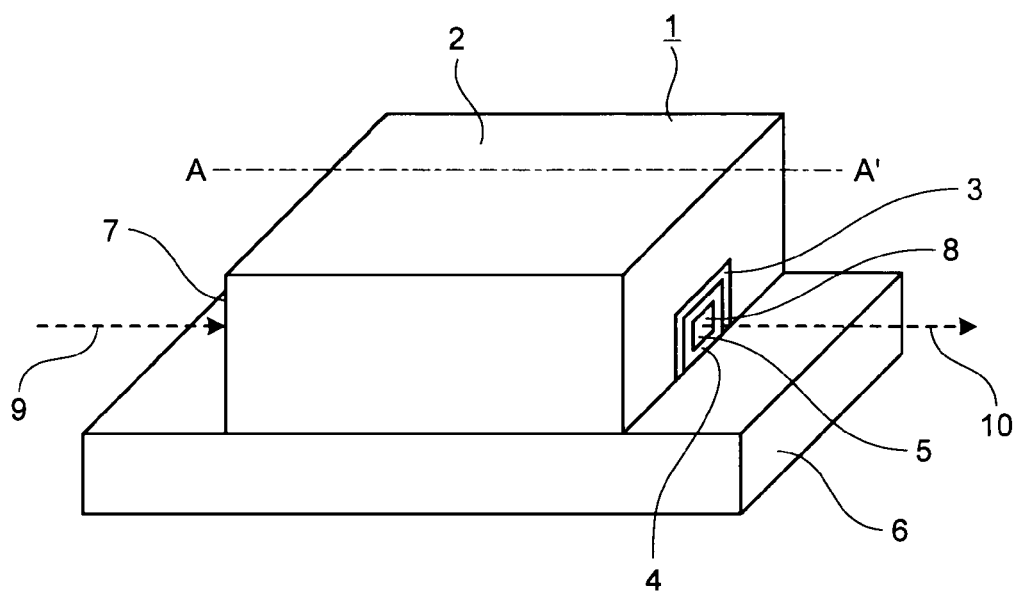
FIG. 1 is a configuration diagram of an optical wavelength conversion element according to a first embodiment of the present invention.
Figure 2:
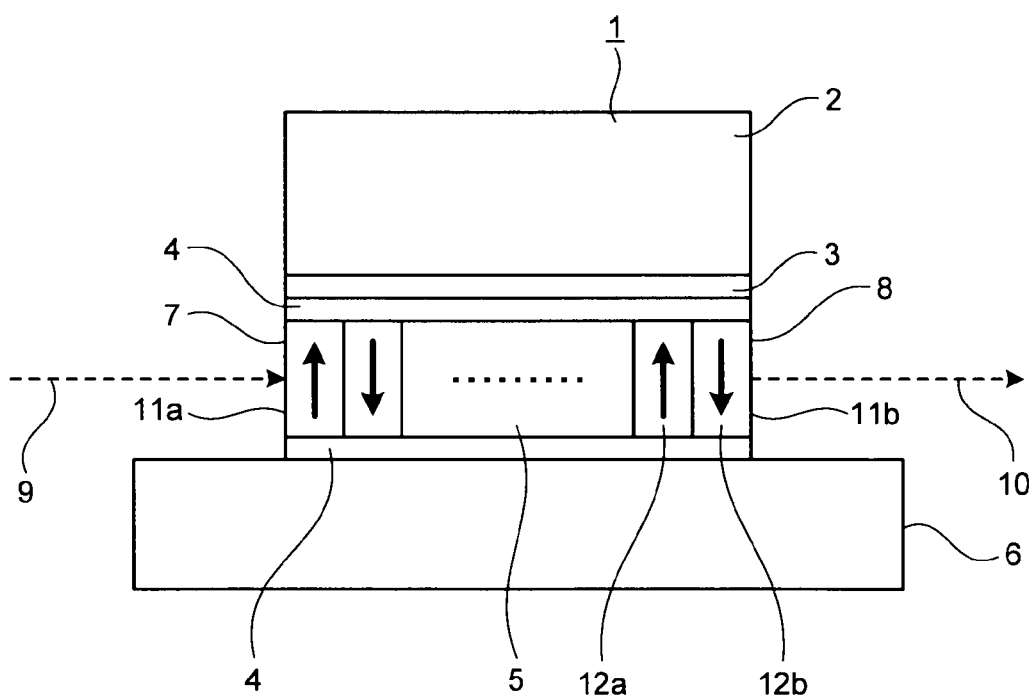
FIG. 2 is a configuration diagram of the optical wavelength conversion element according to the first embodiment of the present invention.

FIGS. 1 and 2 are configuration diagrams of an optical wavelength conversion element according to a first embodiment of the present invention. FIG. 1 is a perspective view, and FIG. 2 is a cross-sectional view of a cross section A-A' shown in FIG. 1. In these drawings, like reference signs refer to like or corresponding parts.

In FIGS. 1 and 2, an optical wavelength conversion element 1 is configured by a substrate 2, a conducting unit 3 as a first conducting unit, a clad 4 as a first clad and a second clad, a wavelength conversion waveguide 5, a heat sink 6 also functioning as a second conducting unit, a reflection preventing unit 7 (not shown), and a reflection preventing unit 8 (not shown). Reference numeral 9 denotes fundamental wave light that is light as a fundamental wave, 10 denotes wavelength conversion light as a harmonic, 11a and 11b denote end faces of the wavelength conversion waveguide 5, and 12a and 12b denote domains of the wavelength conversion waveguide 5.

In FIGS. 1 and 2, the reflection preventing unit 7 is provided in contact with the end face 11a, the reflection preventing unit 8 is provided in contact with the end face 11b, and the clad 4 is provided in contact with interfaces other than the end faces 11a and 11b, in the wavelength conversion waveguide 5. The conducting unit 3 is formed in contact with three back surfaces of the clad 4, the back surfaces being back surfaces of interfaces that are in contact with the wavelength conversion waveguide 5. The heat sink 6 is provided in contact with the rest of the back surfaces of interfaces. The substrate 2 is provided in contact with back surfaces of the conducting unit 3, the back surfaces being back surfaces of interfaces that are in contact with the clad 4.

Operations are explained next. The fundamental wave light 9 is incident to the end face 11a of the wavelength conversion waveguide 5 via the reflection preventing unit 7, and propagates within the wavelength conversion waveguide 5. Within the wavelength conversion waveguide 5, there occur a light wavelength change such as an occurrence of a second harmonic, an occurrence of a sum frequency, and an occurrence of a difference frequency, and an optical parametric amplification, by utilizing a second-order nonlinear optical effect. The fundamental wave light 9 is converted into the wavelength conversion light 10 along a propagation within the wavelength conversion waveguide 5. The wavelength conversion light 10 that reaches the end face 1 lb of the wavelength conversion waveguide 5 is emitted from the end face 11b of the wavelength conversion waveguide 5 via the reflection preventing unit 8.

It is preferable that the material of the conducting unit 3 has a high electric conductivity. For example, there can be used a metal film of gold, silver, copper, aluminum, chrome or the like. In this example, a metal film of gold is used for the conducting unit 3.

It is preferable that the material of the substrate 2 has a mechanical strength capable of holding the wavelength conversion waveguide 5 and has a heat expansion coefficient that is the same value as that of the wavelength conversion waveguide 5, to suppress a stress change due to a temperature change. Therefore, a material that is the same as a waveguide material is generally used for a reinforcing substrate. In this example, lithium niobate (hereinafter, "LiNbO$_3$" or "LN") is used for the substrate 2.

Figure 3:
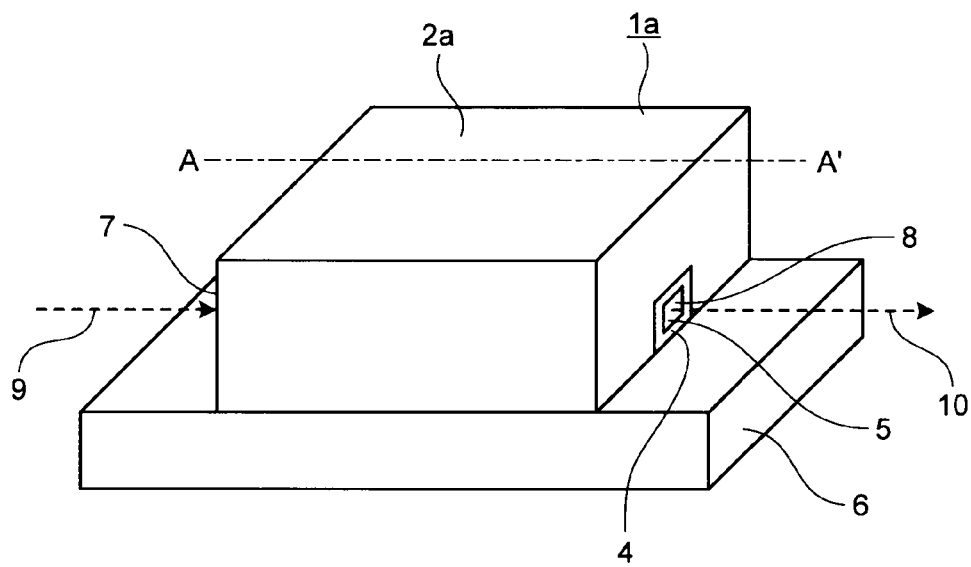
FIG. 3 is a configuration diagram of the optical wavelength conversion element according to the first embodiment of the present invention.
Figure 4:
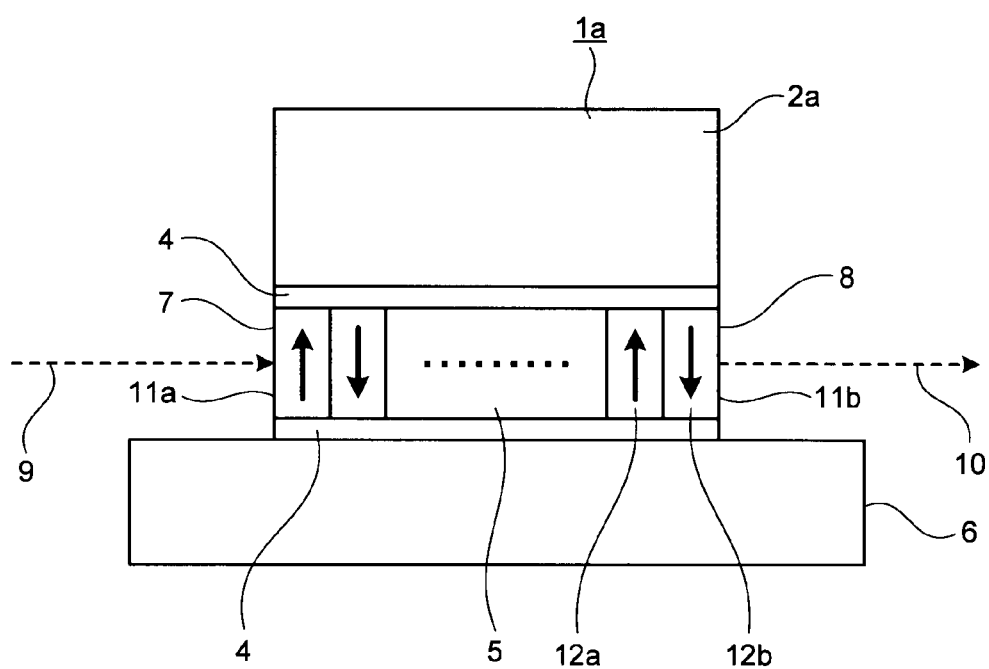
FIG. 4 is a configuration diagram of the optical wavelength conversion element according to the first embodiment of the present invention.

The substrate 2 described above can be changed to, as shown in FIGS. 3 and 4, a substrate 2a that uses the same kind of material having an increased conductivity or uses a material having a high mechanical strength, a heat expansion coefficient that is substantially the same as that of the wavelength conversion waveguide 5, and a high conductivity, so that an optical wavelength conversion element 1a can be formed while eliminating the conducting unit 3. The conductivity of the substrate 2a can be increased by a method, such as a process of reducing oxygen of LN, i.e., a process of partially removing oxygen, or a process of adding iron to LN. In this case, the substrate 2a having a conductivity constitutes the conducting unit 3.

In the wavelength conversion waveguide 5, a periodic polarization reversal structure is formed to obtain a pseudo phase matching by using a ferroelectric material of a high nonlinear optical constant. The polarization reversal periodic width becomes a length that is twice of an interaction length determined by a wavelength of the fundamental wave light 9, a refractive index of the wavelength conversion waveguide 5 in the wavelength of the fundamental wave light 9, and a refractive index of the wavelength conversion waveguide 5 in a wavelength of the wavelength conversion light 10.

A normal material has a wavelength dispersion in refractive index, and the phase of the fundamental wave light 9 does not match the phase of the wavelength conversion light 10. In a polarization periodic structure, the domains 12a and 12b of which directions of intrinsic polarization are inverted are alternately and cyclically formed for each interaction length, to match the phase of the fundamental wave light 9 with the phase of the wavelength conversion light 10. The pseudo phase matching is a method for obtaining a phase matching by spatially cycle-inverting the intrinsic polarization in this manner.

The clad 4 has a function of enclosing the fundamental wave light 9 incident within the wavelength conversion waveguide 5 and the wavelength conversion light 10 generated within the wavelength conversion waveguide 5. The material of the clad 4 is preferably a material (a dielectric) having a refractive index lower than that of the wavelength conversion waveguide 5 and having a heat expansion coefficient close to that of the wavelength conversion waveguide 5. For example, SiO$_2$ and Ta$_2$O$_5$ are suitable.

The heat sink 6 has a function of the second conducting unit and has a function of discharging heat generated in the wavelength conversion waveguide 5. The heat sink 6 is made of a material having a high electric conductivity and a small heat resistance. For example, copper and aluminum are suitable for a material of the heat sink 6.

The reflection preventing unit 7 has a function of preventing a reflection for a wavelength of the fundamental wave light 9, and the reflection preventing unit 8 has a function of preventing a reflection for a wavelength of the wavelength conversion light 10. The reflection preventing unit 7 can have a function of totally reflecting the wavelength of the wavelength conversion light 10, and the reflection preventing unit 8 can have a function of totally reflecting the wavelength of the fundamental wave light 9. In this case, the fundamental wave light 9 that is propagated within the wavelength conversion waveguide 5 and reaches the end face 11b of the wavelength conversion waveguide 5 without being converted into the wavelength conversion light 10 is reflected on the end face 11b of the wavelength conversion waveguide 5 by the reflection preventing unit 8. The fundamental wave light 9 is propagated within the wavelength conversion waveguide 5 again, and is converted into the wavelength conversion light 10. The wavelength conversion light 10 reaches the end face 11a of the wavelength conversion waveguide 5, and thereafter is reflected by the reflection preventing unit 7. The wavelength conversion light 10 is propagated within the wavelength conversion waveguide 5, and is emitted from the end face 11b of the wavelength conversion waveguide 5. Accordingly, wavelength conversion efficiency can be improved.

Figure 5:
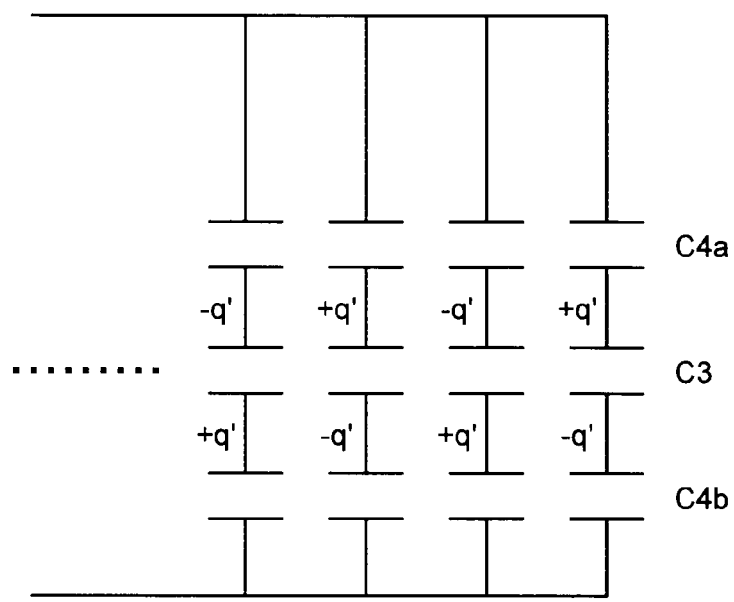
FIG. 5 is an explanatory diagram for explaining the optical wavelength conversion element according to the first embodiment of the present invention.

FIG. 5 depicts a circuit model of the optical wavelength conversion element 1 according to the first embodiment of the present invention. C3 denotes an electrostatic capacitance of the wavelength conversion waveguide 5, C4a denotes an electrostatic capacitance of the clad 4 that is in contact with the conducting unit 3, and C4b denotes an electrostatic capacitance of the clad 4 that is in contact with the heat sink 6. The domains 12a and 12b of a periodic polarization reversal structure within the wavelength conversion waveguide 5 are connected in parallel by the conducting unit 3 and the heat sink 6. Therefore, an electric charge generated within the wavelength conversion waveguide 5 moves to the clad 4 that is in contact with the conducting unit 3 or the heat sink 6. Consequently, the electric field strength within the wavelength conversion waveguide 5 can be decreased.

With this arrangement, movements of impurity ions within the domains of crystals can be suppressed, variations of refractive index in each domain can be substantially eliminated, and changes of a waveguide loss can be substantially eliminated. Further, because a change of refractive index attributable to electro-optic effects can be also substantially eliminated, a stable wavelength-conversion output can be achieved and long-term reliability can be maintained. Because influences of pyroelectric effects attributable to the substrate 2 can be also eliminated, damage of the clad 4 due to a temperature change during the manufacturing process can be also suppressed.

As described above, in the optical wavelength conversion element according to the first embodiment of the present invention, domains are electrically connected in parallel via the clads. Therefore, influences of pyroelectric effects in a periodic polarization reversal structure can be reduced, and stable wavelength conversion characteristics can be obtained.

Second Embodiment

Figure 6:
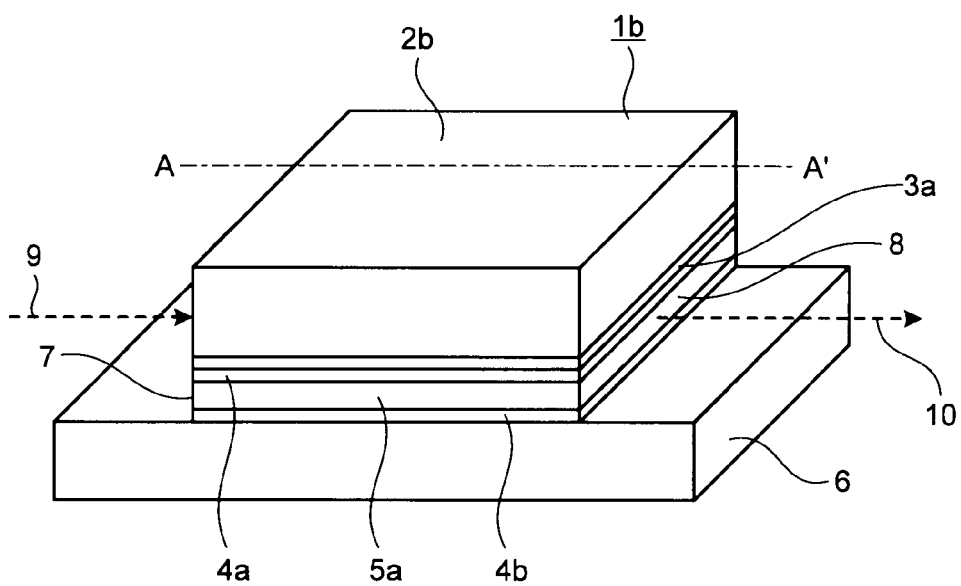
FIG. 6 is a configuration diagram of an optical wavelength conversion element according to a second embodiment of the present invention.
Figure 7:
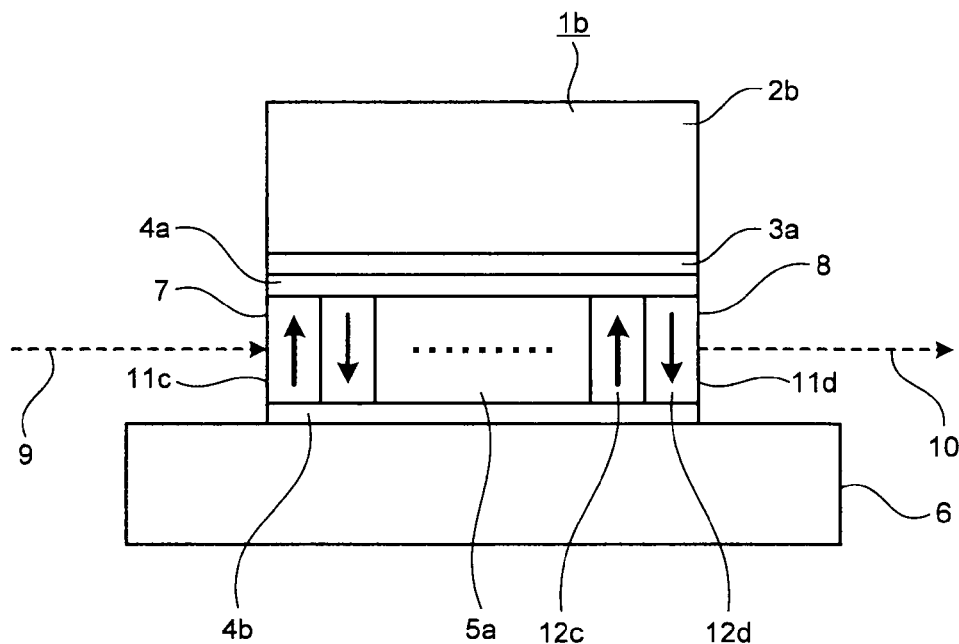
FIG. 7 is a configuration diagram of the optical wavelength conversion element according to the second embodiment of the present invention.

FIGS. 6 and 7 are configuration diagrams of an optical wavelength conversion element according to a second embodiment of the present invention. FIG. 6 is a perspective view, and FIG. 7 is a cross-sectional view of a cross section A-A' shown in FIG. 6. In these drawings, like reference signs refer to like or corresponding parts.

In FIGS. 6 and 7, an optical wavelength conversion element 1b is configured by a substrate 2b, a conducting unit 3a as a first conducting unit, a clad 4a as a first clad, a clad 4b as a second clad, a wavelength conversion waveguide having a planar structure (hereinafter, "planar wavelength conversion waveguide") 5a, the heat sink 6 also functioning as a second conducting unit, the reflection preventing unit (not shown), and the reflection preventing unit 8 (not shown). Reference numeral 9 denotes fundamental wave light that is light as a fundamental wave, 10 denotes wavelength conversion light as a harmonic, 11c and 11d denote end faces of the wavelength conversion waveguide 5a, and 12c and 12d denote domains of the wavelength conversion waveguide 5a.

In FIGS. 6 and 7, the substrate 2b, the conducting unit 3a, the clad 4a, the planar wavelength conversion waveguide 5a, the clad 4b, and the heat sink 6 are provided in this order from the top in the optical wavelength conversion element 1b. The reflection preventing unit 7 is provided on the end face 11c of the planar wavelength conversion waveguide 5a, and the reflection preventing unit 8 is provided on the end face 11d of the planar wavelength conversion waveguide 5a.

Operations are explained next. The fundamental wave light 9 is incident to the end face 11c of the planar wavelength conversion waveguide 5a, a fast-axis direction component propagates within the planar wavelength conversion waveguide 5a, and a slow-axis direction component is spatially propagated. Within the planar wavelength conversion waveguide 5a, there occur a light wavelength change such as an occurrence of a second harmonic, an occurrence of a sum frequency, and an occurrence of a difference frequency, and an optical parametric amplification, by utilizing a second-order nonlinear optical effect. The fundamental wave light 9 is converted into the wavelength conversion light 10 along a propagation within the planar wavelength conversion waveguide 5a. The wavelength conversion light 10 that reaches the end face 11d of the planar wavelength conversion waveguide 5a is emitted from the end face 11d of the planar wavelength conversion waveguide 5a via the reflection preventing unit 8. In this case, when the planar structure is used, the fundamental wave light 9 and the wavelength conversion light 10 are spatially propagated in a lateral direction, and their beam widths can be expanded. Accordingly, power scaling becomes easy, and a high output can be achieved. Other operations of the second embodiment are similar to those of the optical wavelength conversion element 1 according to the first embodiment of the present invention, and have similar operational effects.

In a manufacturing method of the optical wavelength conversion element 1b using a metal film for the conducting unit 3a, firstly, a metal film is formed by sputtering or the like on the substrate 2b of which interface is polished. Next, the clad 4a is deposited on the planar wavelength conversion waveguide 5a. The clad 4a and the metal film as the conducting unit 3a formed on the substrate 2b are adhered to each other using an optical adhesive. The planar wavelength conversion waveguide 5a is polished in a desired thickness from the other surface opposing an adhesion surface. Thereafter, a film of the clad 4b is formed on a polished interface of the planar wavelength conversion waveguide 5a, and the heat sink 6 is adhered using an adhesive having an excellent heat conductivity.

Figure 8:
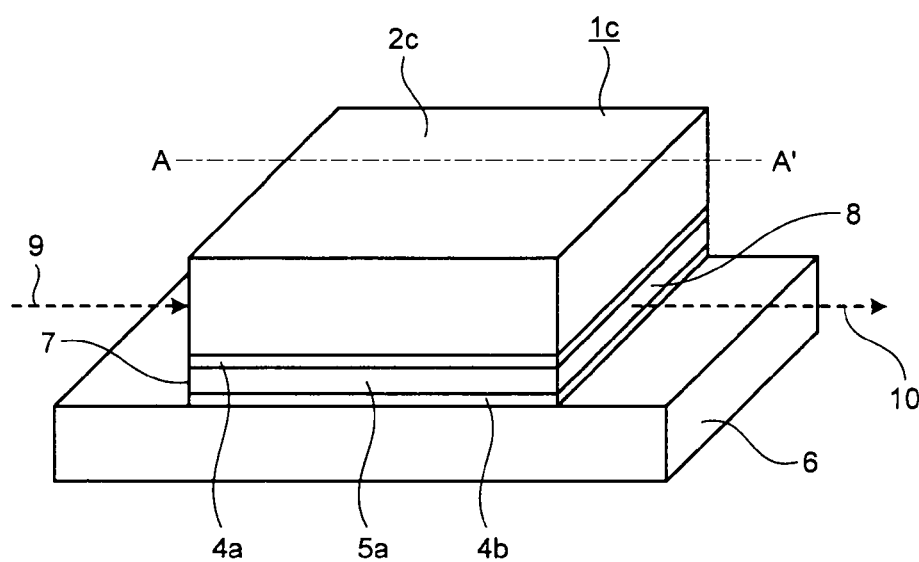
FIG. 8 is a configuration diagram of the optical wavelength conversion element according to the second embodiment of the present invention.
Figure 9:
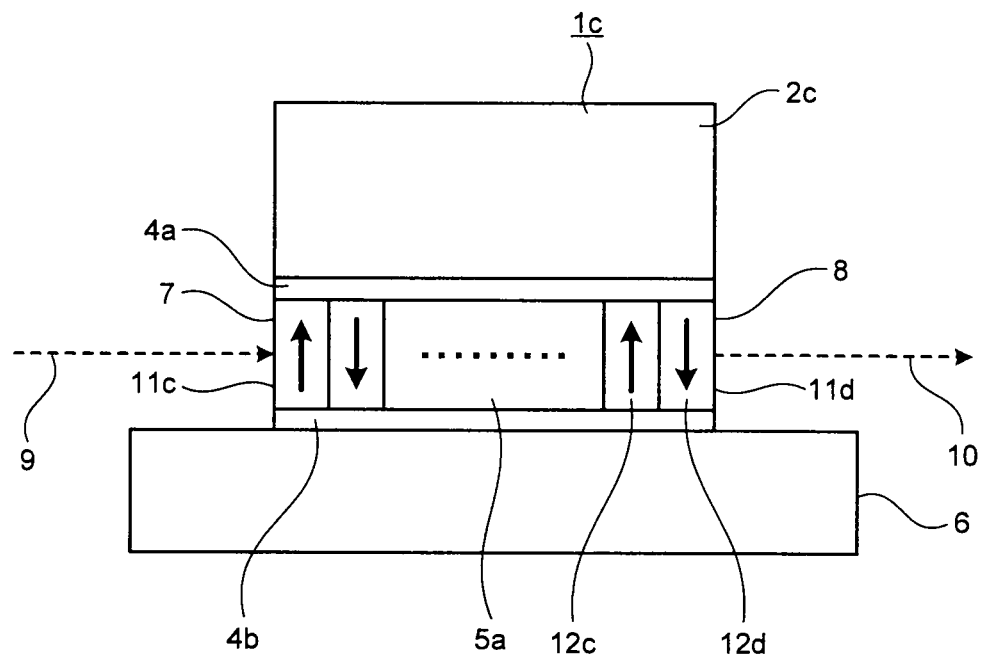
FIG. 9 is a configuration diagram of the optical wavelength conversion element according to the second embodiment of the present invention.

Similarly to the optical wavelength conversion element 1a according to the first embodiment of the present invention, the substrate 2b can be changed to, as shown in FIGS. 8 and 9, a substrate 2c using the same kind of material having an improved conductivity or a material having a high mechanical strength, a heat expansion coefficient that is substantially the same as that of the planar wavelength conversion waveguide 5a, and a high conductivity, so that an optical wavelength conversion element 1c can be formed while eliminating the conducting unit 3a. In this case, the substrate 2b functions as the conducting unit 3a.

As described above, in the optical wavelength conversion element according to the second embodiment of the present invention, domains are electrically connected in parallel via the clads. Therefore, influences of pyroelectric effects in a periodic polarization reversal structure can be reduced, and stable wavelength conversion characteristics can be obtained.

Further, a high output becomes possible because a planar structure is provided.

In the first and second embodiments described above, other nonlinear materials can be also used for the wavelength conversion waveguides 5 and 5a and the substrates 2, 2a, 2b, and 2c. For example, there can be used stoichiometric lithium niobate (stoichiometric $LiNbO_3$, hereinafter SLN), congruent lithium niobate (congruent $LiNbO_3$, hereinafter CLN), stoichiometric lithium tantalate (stoichiometric $LiTaO_3$, hereinafter SLT), congruent lithium tantalate (congruent $LiTaO_3$, hereinafter CLT), MgO-doped stoichiometric lithium niobate (MgO-doped stoichiometric $LiNbO_3$ (MgO:SLN)), MgO-doped congruent lithium niobate (MgO-doped congruent $LiNbO_3$, (MgO:CLN)), MgO-doped stoichiometric lithium tantalate (MgO-doped stoichiometric $LiTaO_3$ (MgO:SLT)), MgO-doped congruent lithium tantalate $LiTaO_3$ (MgO:CLT)), ZnO-doped stoichiometric lithium tantalate (ZnO-doped stoichiometric $LiTaO_3$ (ZnO:SLT)), and ZnO-doped congruent lithium tantalate (ZnO-doped congruent $LiTaO_3$ (ZnO:CLT)). These materials have operational effects similar to those of the materials mentioned above.

Third Embodiment

Figure 10:
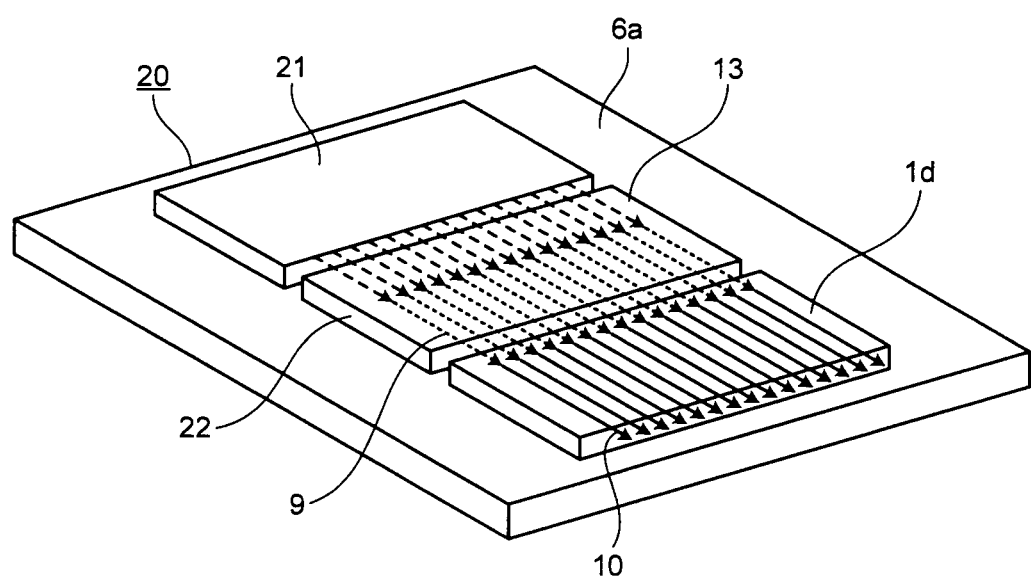
FIG. 10 is a configuration diagram of a wavelength conversion laser device according to a third embodiment of the present invention.

FIG. 10 is a configuration diagram of a wavelength conversion laser device according to a third embodiment of the present invention. In the drawing, like reference signs refer to like or corresponding parts. In FIG. 10, a wavelength conversion laser device 20 is configured by a excitation light source 21, a laser medium 22, an optical wavelength conversion element 1d, and a heat sink 6a. A laser light source is configured by the excitation light source 21 and the laser medium 22. Reference numeral 9 denotes fundamental wave light, 10 denotes wavelength conversion light, and 13 denotes excitation light. The optical wavelength conversion elements 1, 1a, 1b, and 1c explained in the first and second embodiments described above can be used as the optical wavelength conversion element 1d.

The excitation light source 21, the laser medium 22, and the optical wavelength conversion element 1d are provided on the heat sink 6a. The excitation light source 21, the laser medium 22, and the optical wavelength conversion element 1d are arranged in this order.

It is preferable that the excitation light source 21 includes a plurality of emitters and outputs the excitation light 13 having a small spread angle with respect to a plane direction of the laser medium 22, and an oscillation wavelength sufficiently absorbed by the laser medium 22. In this example, an LD (Laser Diode) array is used as the excitation light source 21.

It is preferable that the laser medium 22 forms a planar structure, has a high gain in a wavelength of the fundamental wave light 9, and is excellent in mechanical strength and heat conductivity.

Operations are explained next. The excitation light 13 emitted from the excitation light source 21 is incident to the laser medium 22. The excitation light 13 incident to the laser medium 22 is propagated through a waveguide in a vertical direction, is spatially propagated in a plane direction, and optically excites the laser medium 22. The generated fundamental wave light 9 is resonated on a surface opposite to an incident surface of theF excitation light source 21 of the laser medium 22. The fundamental wave light 9 is amplified, and oscillates as laser light when a gain exceeds a loss. The fundamental wave light 9 oscillated is incident to the optical wavelength conversion element 1d, is converted into the wavelength conversion light 10 by utilizing a second-order nonlinear optical effect, and is emitted from a surface opposite to a surface to which the fundamental wave light 9 is incident. The wavelength conversion light 10 is obtained as a result.

Further, a reflection preventing unit for the fundamental wave light 9 is provided on a fundamental-wave emission surface of the laser medium 22. A total-reflection unit for the fundamental wave light 9 is provided on a wavelength-conversion-light emission surface of the optical wavelength conversion element 1d. Another total-reflection unit for the wavelength conversion light 10 is provided on a fundamental-wave-light emission surface of the optical wavelength conversion element 1d. With this arrangement, wavelength-converted light can be output to the outside of a resonator as a combined output, and a remaining fundamental wave can be used again by the resonator, and thus high efficiency can be achieved.

When the laser medium 22 has such a planar structure, the beam width can be expanded to a lateral direction, the structure sufficiently matches the LD array, power scaling becomes easy, and a high output can be achieved. In this case, the optical wavelength conversion elements 1b and 1c having the planar wavelength conversion waveguide 5a can be also used as the optical wavelength conversion element 1d.

As described above, the wavelength conversion laser device according to the third embodiment of the present invention uses the optical wavelength conversion element according to the second embodiment of the present invention. Therefore, stable wavelength-conversion light can be obtained. Further, because the laser medium 22 has a planar structure, a high output can be achieved.

Fourth Embodiment

Figure 11:
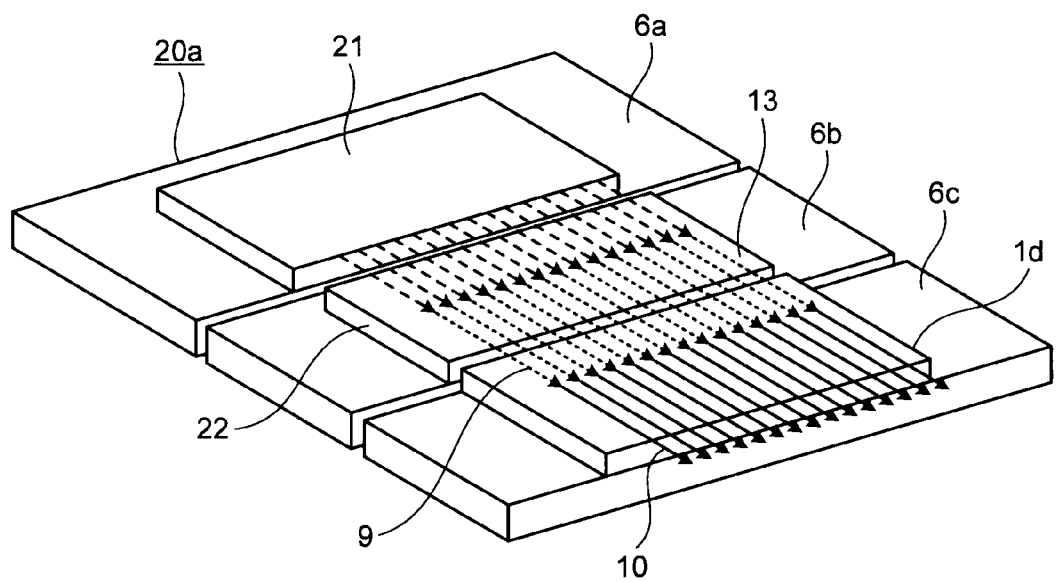
FIG. 11 is a configuration diagram of a wavelength conversion laser device according to a fourth embodiment of the present invention.

FIG. 11 is a configuration diagram of a wavelength conversion laser device according to a fourth embodiment of the present invention. In the drawing, like reference signs refer to like or corresponding parts. In FIG. 11, a wavelength conversion laser device 20a is configured by the excitation light source 21, the laser medium 22, the optical wavelength conversion element 1d, and heat sinks 6a, 6b, and 6c. A laser light source is configured by the excitation light source 21 and the laser medium 22. Reference numeral 9 denotes fundamental wave light, 10 denotes wavelength conversion light, and 13 denotes excitation light. The optical wavelength conversion elements 1, 1a, 1b, and 1c explained in the first and second embodiments described above can be used as the optical wavelength conversion element 1d.

The excitation light source 21, the laser medium 22, and the optical wavelength conversion element 1d are provided on the heat sinks 6a, 6b, and 6c, respectively. The excitation light source 21, the laser medium 22, and the optical wavelength conversion element 23 are provided in this order.

Other configurations of the fourth embodiment are similar to those of the third embodiment, and therefore explanations thereof are omitted. Furthermore, operations of the fourth embodiment are also similar to those of the third embodiment, and therefore explanations thereof are omitted.

By the wavelength conversion laser device according to the fourth embodiment of the present invention, effects similar to those of the third embodiment can be achieved.

Fifth Embodiment

Figure 12:
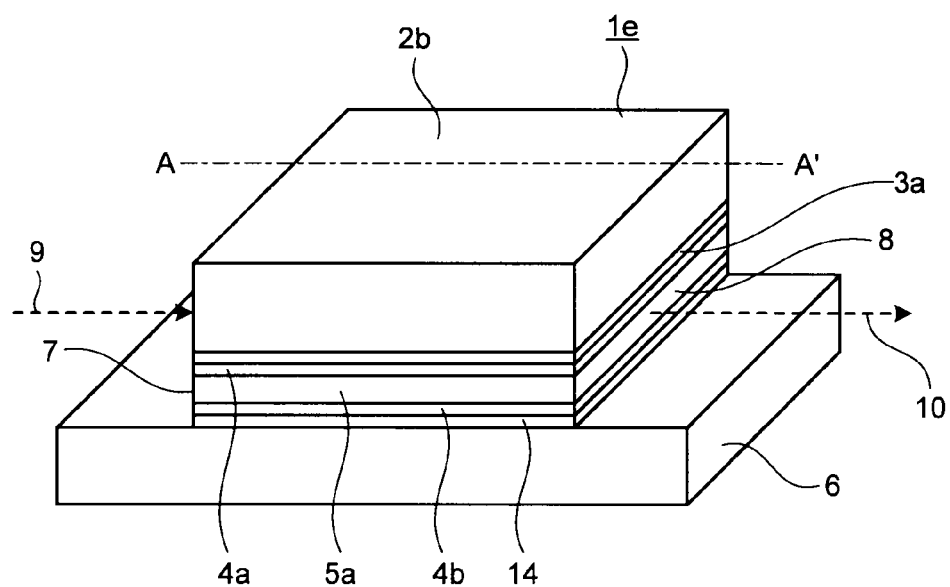
FIG. 12 is a configuration diagram of an optical wavelength conversion element according to a fifth embodiment of the present invention.
Figure 13:
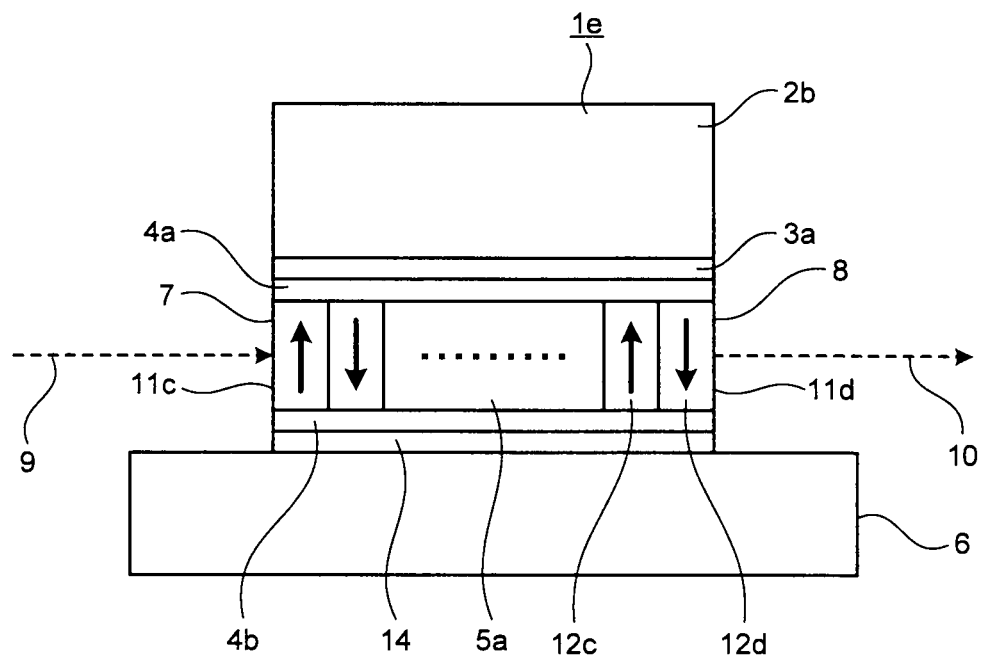
FIG. 13 is a configuration diagram of the optical wavelength conversion element according to the fifth embodiment of the present invention.

FIGS. 12 and 13 are configuration diagrams of an optical wavelength conversion element according to a fifth embodiment of the present invention. FIG. 12 is a perspective view, and FIG. 13 is a cross-sectional view of a cross section A-A' shown in FIG. 12. In these drawings, like reference signs refer to like or corresponding parts. In FIGS. 12 and 13, an optical wavelength conversion element 1e is configured by the substrate 2b, the conducting unit 3a as a first conducting unit, the clad 4a as a first clad, the clad 4b as a second clad, the wavelength conversion waveguide having a planar structure (hereinafter, "planar wavelength conversion waveguide") 5a, a metal film 14, the heat sink 6, the reflection preventing unit 7 (not shown), and the reflection preventing unit 8 (not shown). Both of the metal film 14 and the heat sink 6 can also function as a second conducting unit, or only either one of them can be configured to function as the second conducting unit. Reference numeral 9 denotes fundamental wave light that is light as a fundamental wave, 10 denotes wavelength conversion light as a harmonic, 11c and 11d denote end faces of the wavelength conversion waveguide 5a, and 12c and 12d denote domains of the wavelength conversion waveguide 5a.

In FIGS. 12 and 13, the substrate 2b, the conducting unit 3a, the clad 4a, the planar wavelength conversion waveguide 5a, the clad 4b, the metal film 14, and the heat sink 16 are provided in this order from the top in the optical wavelength conversion element 1e. The reflection preventing unit 7 is provided on the end face 11c of the planar wavelength conversion waveguide 5a, and the reflection preventing unit 8 is provided on the end face 11d of the planar wavelength conversion waveguide 5a.

Operations of the optical wavelength conversion element 1e are similar to those of the optical wavelength conversion element 1b according to the second embodiment of the present invention, and have similar operational effects.

In a manufacturing method of the optical wavelength conversion element 1d using a metal film for the conducting unit 3a, firstly, a metal film for the conducting unit 3a is formed by sputtering or the like on the substrate 2b of which interface is polished. Next, the clad 4a is deposited on the planar wavelength conversion waveguide 5a. The clad 4a and the metal film as the conducting unit 3a formed on the substrate 2b are adhered to each other using an optical adhesive. The planar wavelength conversion waveguide 5a is polished in a desired thickness from the other surface opposing an adhesion surface. Thereafter, a film of the clad 4b is formed on a polished interface of the planar wavelength conversion waveguide 5a, the metal film 14 is deposited on an outer surface of the clad 4b, and the heat sink 6 is bonded by solder.

The metal film 14 is provided to improve the adherability of solder, and achieves solder connection between the waveguide 5a and the heat sink 6.

For example, films of Cr, Ni, and Au are preferred for the material of the metal film 14, and when LN is used as the material of the substrate 2b, high-temperature solder connection becomes possible by using a heat sink made of Cu having a linear expansion coefficient close to that of LN. A heat sink made of Si having excellent processability can be connected by using low-temperature solder.

Similarly to the optical wavelength conversion element 1a according to the first embodiment of the present invention, the substrate 2b can be changed to a substrate using the same kind of material having an improved conductivity or to a material having a high mechanical strength, a heat expansion coefficient that is substantially the same as that of the planar wavelength conversion waveguide 5a, and a high conductivity, so that the optical wavelength conversion element 1c can be formed while eliminating the conducting unit 3a. In this case, the substrate 2b functions as the conducting unit 3a.

As explained above, in the optical wavelength conversion element according to the fifth embodiment of the present invention, the waveguide and the heat sink are bonded by solder. Therefore, the heat conductivity, connection strength, and reliability can be improved, and the solder thickness can be controlled. Consequently, high-precision connection can be achieved.

Sixth Embodiment

Figure 14:
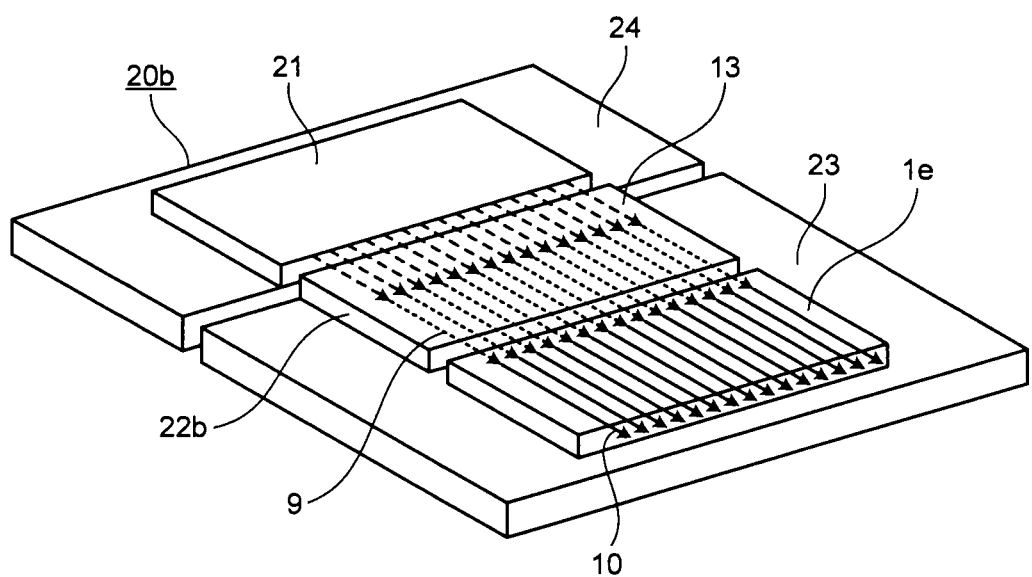
FIG. 14 is a configuration diagram of a wavelength conversion laser device according to a sixth embodiment of the present invention.

FIG. 14 is a configuration diagram of a wavelength conversion laser device according to a sixth embodiment of the present invention. In the drawing, like reference signs refer to like or corresponding parts. In FIG. 14, a wavelength conversion laser device 20b is configured by the excitation light source 21, a laser medium 22b, the optical wavelength conversion element 1e, and a heat sink 24. A laser light source is configured by the excitation light source 21 and the laser medium 22b of a waveguide type.

Reference numeral 9 denotes fundamental wave light, 10 denotes wavelength conversion light, and 13 denotes excitation light.

Positions of the laser medium 22b and the optical wavelength conversion element 1e are adjusted on a plane of the same substrate 23, and are bonded by solder (not shown). Positional precision in a waveguide fast-axis direction, and angle precision in an elevation direction and a roll direction are determined by plane precision of the substrate 23. An optical axis adjustment of the laser medium 22b and the optical wavelength conversion element 1e is limited to only a positional adjustment in a waveguide slow-axis direction, a distance adjustment between the laser medium 22b and the optical wavelength conversion element 1e, and an angular adjustment in an azimuth direction between the laser medium 22b and the optical wavelength conversion element 1e.

The thickness of solder used for solder connection can be adjusted in high precision, and uniform connection is possible. Therefore, a positional deviation in the waveguide fast-axis direction of the laser medium 22b and the optical wavelength conversion element 1e and an angular deviation in a roll direction can be minimized.

Operations of the wavelength conversion laser device 20b are similar to those of the wavelength conversion laser device 20 according to the third embodiment, and have similar operational effects.

As explained above, the wavelength conversion laser device 20b according to the sixth embodiment of the present invention uses the optical wavelength conversion element according to the fifth embodiment of the present invention, and the laser medium 22b and the optical wavelength conversion element 1e can be connected on the same substrate 23. Therefore, downsizing, processing, and optical adjustment of a laser device become easy, and the laser device 20b can be provided at a low cost.

Seventh Embodiment

When the wavelength conversion laser device according to the third embodiment of the present invention is configured such that green laser beam is generated by, for example, wavelength-converting a fundamental wave, which is infrared light having a doubled wavelength of green, the wavelength conversion laser device can be used as a green light source of a laser television.

Figure 15:
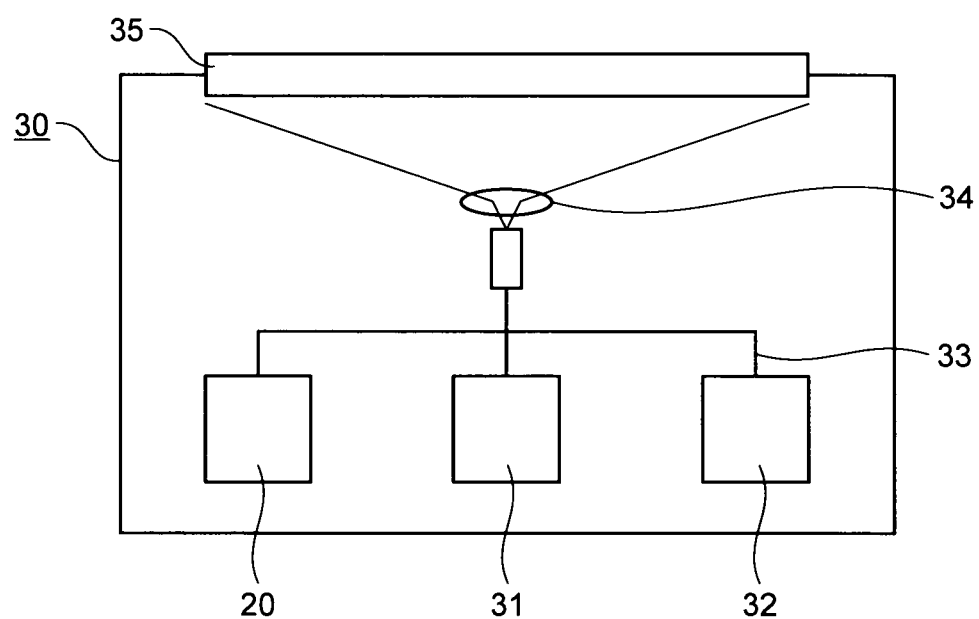
FIG. 15 is a configuration diagram of an image display device according to a seventh embodiment of the present invention.

FIG. 15 is a configuration diagram of an image display device according to a seventh embodiment of the present invention. In the drawing, like reference signs refer to like or corresponding parts. In FIG. 15, a laser television 30 as an image display device is configured by the wavelength conversion laser device 20 as a green light source, a red light source 31, a blue light source 32, a light propagation unit 33, an optical system 34, and a screen 35.

Operations are explained next. Laser light of red, laser light of green, and laser light of blue respectively emitted by the red light source 31, the wavelength conversion laser device 20 as a green light source, and the blue light source 32 are combined together by the light propagation unit 33, and are emitted to the optical system 34. The optical system 34 projects the combined laser light to the screen 35. An image corresponding to television image information contained in each laser light is displayed on the screen 35. By using a laser for a light source to display a television image, a display with excellent color reproducibility, high brightness, high precision, high color resolution, and lower power consumption can be achieved.

Green laser light is difficult to be directly oscillated by a semiconductor laser. Therefore, it has been conventionally desired that a green light source suitable for a laser television is put to practical use. A laser television can be achieved by using the wavelength conversion laser device 20 as a green light source that can obtain stable and high-output wavelength conversion light. The wavelength conversion laser device 20 can be also used as light sources of other colors. While a case of using the wavelength conversion laser device 20 according to the third embodiment for a light source of the image display device has been explained in this example, the wavelength conversion laser devices 20a and 20b according to the fourth and sixth embodiments can be also used as light sources of other colors.

As described above, in the image display device according to the seventh embodiment of the present invention, the wavelength conversion laser device according to the third embodiment of the present invention is used for a green light source. Therefore, a laser television with excellent color reproducibility, high brightness, high precision, high color resolution, and lower power consumption can be achieved.

Industrial Applicability

As described above, the optical wavelength conversion element according to the present invention is useful for a wavelength conversion laser device, and particularly suitable for a green light source.

Reference Signs List 1, 1a, 1b, 1c, 1d, 1e OPTICAL WAVELENGTH CONVERSION ELEMENT
2, 2a, 2b, 2c SUBSTRATE
3, 3a, 3b CONDUCTING UNIT
4, 4a, 4b CLAD
5, 5a WAVELENGTH CONVERSION WAVEGUIDE
6, 6a, 6b, 6c HEAT SINK
9 FUNDAMENTAL WAVE LIGHT
10 WAVELENGTH CONVERSION LIGHT
11a, 11b, 11c, 11d END FACE OF WAVELENGTH CONVERSION WAVEGUIDE
12a, 12b, 12c, 12d DOMAIN
13 EXCITATION LIGHT
14 METAL FILM
20, 20a, 20b WAVELENGTH CONVERSION LASER DEVICE
21 EXCITATION LIGHT SOURCE
22, 22b LASER MEDIUM
23, 24 SUBSTRATE
30 LASER TELEVISION
31 RED LIGHT SOURCE
32 BLUE LIGHT SOURCE
33 LIGHT PROPAGATION UNIT
34 OPTICAL SYSTEM
35 SCREEN

The invention claimed is:

1. An optical wavelength conversion element comprising:
a wavelength conversion waveguide that has a periodic polarization reversal structure having alternately and cyclically formed domains of which polarization directions are inverted, guides light as a fundamental wave corresponding to the periodic polarization reversal structure, and performs a wavelength conversion of the guided fundamental wave;
a first clad that is made of a dielectric having a refractive index lower than that of the wavelength conversion waveguide and is provided in contact with each of the domains;
a second clad that is made of a dielectric having a refractive index lower than that of the wavelength conversion waveguide and is provided in contact with each of the domains such that the second clad is opposed to the first clad;
a first conducting unit that electrically connects to each of the domains in parallel via the first clad; and
a second conducting unit that electrically connects to each of the domains in parallel via the second clad, wherein the second conducting unit is a conductive heat sink that is provided at a side of the second clad and discharges heat generated by the wavelength conversion waveguide.

2. The optical wavelength conversion element according to claim 1, further comprising:
a substrate that is provided at a side of the first clad and fixes the wavelength conversion waveguide; and
a metal film provided between the first clad and the substrate, wherein
the first conducting unit is the metal film.

3. The optical wavelength conversion element according to claim 1, wherein the first conducting unit is a conductive substrate that is provided at a side of the first clad and fixes the wavelength conversion waveguide.

4. The optical wavelength conversion element according to claim 3, wherein
the wavelength conversion waveguide is made of lithium niobate or lithium tantalate, and
the substrate is made of oxygen-reduced or iron-added lithium niobate or lithium tantalate.

5. The optical wavelength conversion element according to claim 1, further comprising:
a metal film formed in contact with a side of the second clad; and
a heat sink that discharges heat generated by the wavelength conversion waveguide, wherein
the metal film and the heat sink are bonded by solder.

6. The optical wavelength conversion element according to claim 1, wherein the wavelength conversion waveguide has a planar structure.

7. A wavelength conversion laser device comprising:
an optical wavelength conversion element that comprises:
a wavelength conversion waveguide that has a periodic polarization reversal structure having alternately and cyclically formed domains of which polarization directions are inverted, guides light as a fundamental wave corresponding to the periodic polarization reversal structure, and performs a wavelength conversion of the guided fundamental wave;
a first clad that is made of a dielectric having a refractive index lower than that of the wavelength conversion waveguide and is provided in contact with each of the domains;
a second clad that is made of a dielectric having a refractive index lower than that of the wavelength conversion waveguide and is provided in contact with each of the domains such that the second clad is opposed to the first clad;
a first conducting unit that electrically connects to each of the domains in parallel via the first clad; and a second conducting unit that electrically connects to each of the domains in parallel via the second clad, wherein the second conducting unit is a conductive heat sink that is provided at a side of the second clad and discharges heat generated by the wavelength conversion waveguide; and a laser light source that generates laser light as a fundamental wave that is to be wavelength-converted by the optical wavelength conversion element.

8. An image display device that uses the wavelength conversion laser device according to claim 7 as a light source for displaying an image.

9. An image display device that uses the wavelength conversion laser device according to claim 7 as a light source of green among light sources of three primary colors forming the light source.

10. The wavelength conversion laser device according to claim 7, further comprising a substrate that is provided at a side of the first clad and fixes the wavelength conversion waveguide.

11. A wavelength conversion laser device comprising:

an optical wavelength conversion element that comprises:

a wavelength conversion waveguide that has a periodic polarization reversal structure having alternately and cyclically formed domains of which polarization directions are inverted, guides light as a fundamental wave corresponding to the periodic polarization reversal structure, and performs a wavelength conversion of the guided fundamental wave;

a first clad that is made of a dielectric having a refractive index lower than that of the wavelength conversion waveguide and is provided in contact with each of the domains;

a second clad that is made of a dielectric having a refractive index lower than that of the wavelength conversion waveguide and is provided in contact with each of the domains such that the second clad is opposed to the first clad;

a first conducting unit that electrically connects to each of the domains in parallel via the first clad; and a second conducting unit that electrically connects to each of the domains in parallel via the second clad; and a laser light source having a laser medium that oscillates as laser light a fundamental wave that is to be wavelength-converted by the optical wavelength conversion element and a excitation light source that outputs excitation light for optically exciting the laser medium, wherein the optical wavelength conversion element and the laser medium are bonded by solder on one substrate.

12. An image display device that uses the wavelength conversion laser device according to claim 11 as a light source for displaying an image.

13. An image display device that uses the wavelength conversion laser device according to claim 11 as a light source of green among light sources of three primary colors forming the light source.

* * * * *